Patented June 10, 1924.

1,497,028

UNITED STATES PATENT OFFICE.

ALEXANDER RITSCHKE, OF DUNEBERG, GERMANY.

MANUFACTURE OF A CELLULOSE MATERIAL.

No Drawing. Application filed May 10, 1921. Serial No. 468,246.

*To all whom it may concern:*

Be it known that I, ALEXANDER RITSCHKE, residing at Duneberg, Germany, have invented a certain new and useful Improved Manufacture of a Cellulose Material, of which the following is a specification.

It is known to manufacture plastic and elastic masses by mixing both softening and gelatinizing means with nitro-cellulose. The gelatinizing means when used in at least the same quantity as the nitro-cellulose shows the same properties as regards softness, as the products which are prepared with softening means or ricinus oil. Nevertheless, such masses prepared with gelatinizing means are suitable only for certain purposes, for instance for the manufacture of soft covers, varnish, artificial leather, wax cloth and the like because due to their softness, they are very liable to injury. If to such products considerable quantities of colouring matters and filling substances, such as chalk, fossil meal or other inorganic substances are added, a harder, more brittle or rosin-like substance will be obtained which can be utilized as a substitute for these and similar substances. It is however impossible to produce with such mixtures, bodies which are at the same time elastic and yet possess a certain hardness and strength to enable for instance a floor to be covered with a covering made in one piece. Such articles can be however obtained by adding some suitable cellulose material such as cork, saw-dust, peat, bark and colouring matters, weighting means and the like to mixtures of nitro-cellulose with a liquid gelatinizing or softening means. A product made from these products shows at least the same favourable properties as a first class cork cellulose mixture manufactured with the assistance of linseed oil, but also has the advantage that, owing to its greater resistance to wear it is not necessary to support the mass by a fabric web. If, however, an ordinary combustible softening of gelatinizing means is added to one that burns with difficulty, the favourable result will be obtained that, in spite of the contents of a large number of easily combustible substances such as nitro-cellulose, cellulose cork and saw dust, such a product is more difficult to burn than the ordinary floor covering of a cork cellulose mixture. The combustibility is of course reduced to a minimum when a non-combustible softening or gelatinizing means is used, such for instance as tri-cresyl-phosphate and para-toluol-sulphoacid-amyl-ester and increases slightly as combustible substances are added. A substitute for elastic products such as a cork cellulose mixture, lincrusta, are manufactured by the combination of: nitrocellulose, a liquid gelatinizing or softening means, a cellulose product such as cork, saw dust, peat refuse and the like and a colouring matter or a filling substance. Unlike all known plastic and elastic masses, the cellulose mixture according to this invention is a substance which is in no way affected by the action of cold and heat between the normal temperatures of —20° to +50° and wears well. It is immaterial whether the substance is obtained with, or without, the aid of a solvent, when mixing the above-mentioned ingredients. Generally speaking, these substances will be manufactured without solvents, and only when using a high percentage nitro-cellulose, the assistance of liquid solvents will be necessary. An example will now be given of suitable mixtures:

350 parts nitro-cellulose containing 100 parts water, are mixed with about 140 parts of phosphoric acid tri-ortho-cresyl-ester, 140 parts of secondary xylidin, 300 parts of cork or saw dust, 100 parts of mineral colouring meal, 50 parts chalk, and kneaded at a temperature of about 75° in a vacuum, until the whole of the water is removed. The product is then formed into sections of different thickness by rolling or pressing with the aid of heat. The sections formed can be used direct as floor covering on concrete, wood, gypsum and the like, with or without gluing means.

In the claims the expression "cellulosic material" is intended to include cork, sawdust, peat and similar materials having the same or substantially the same action.

What I claim as my invention and desire to secure by Letters Patent is:—

1. A cellulose mixture, comprising fibrous nitro-cellulose mixed with a non-volatile, liquid gelatinizing material to render the product permanently elastic, and a cellulosic material, the whole being pressed or rolled into an integral mass.

2. A cellulose mixture, comprising nitrocellulose mixed with a non-volatile, liquid and non-inflammable or difficulty inflammable gelatinizing material to render the product permanently elastic, and a cellulosic material, the whole being pressed or rolled into an integral mass.

3. A cellulose mixture, comprising nitro-cellulose mixed with tri-cresyl phosphate to render the product permanently elastic, a cellulosic material, and a coloring matter, the whole being pressed or rolled into an integral mass.

4. A cellulose mixture, comprising nitro-cellulose mixed with a non-volatile, liquid gelatinizing material to render the product permanently elastic, a cellulosic material, and a filler, the whole being pressed or rolled into an integral mass.

5. A cellulose mixture, comprising nitro-cellulose, a non-inflammable gelatinizing material, a cellulosic material and a coloring material, the whole being thoroughly mixed and pressed or rolled to produce a permanently elastic product.

6. A cellulose mixture, comprising about 350 parts of nitro-cellulose, 140 parts of phosphoric acid tri-ortho-cresyl-ester, 140 parts of secondary xylidin, 300 parts of cork or sawdust, 100 parts of mineral coloring meal, and 50 parts of chalk, the whole being kneaded to form an intricate mixture and rolled or pressed with the application of heat to form a permanently elastic product.

7. A method or process for making a cellulose mixture, which comprises mixing about 350 parts of nitro-cellulose containing 100 parts of water with about 140 parts of phosphoric acid tri-ortho-cresyl-ester, about 140 parts of secondary xylidin, about 300 parts of cork or sawdust, about 100 parts of mineral coloring meal, and about 50 parts of chalk, kneading the mixture thus obtained at a temperature of about 75° in a vacuum until the whole of the water is removed, and rolling or pressing the product thus obtained into an integral mass with the application of heat.

In testimony whereof I have signed my name to this specification in the presence of two subscribing witnesses.

ALEXANDER RITSCHKE.

Witnesses:
A. CONRAD GEMFER,
WERNER GROSH.